S. M. WIXCEL.
HAY LOADER.
APPLICATION FILED MAY 20, 1910.
988,236.
Patented Mar. 28, 1911.
3 SHEETS—SHEET 1.
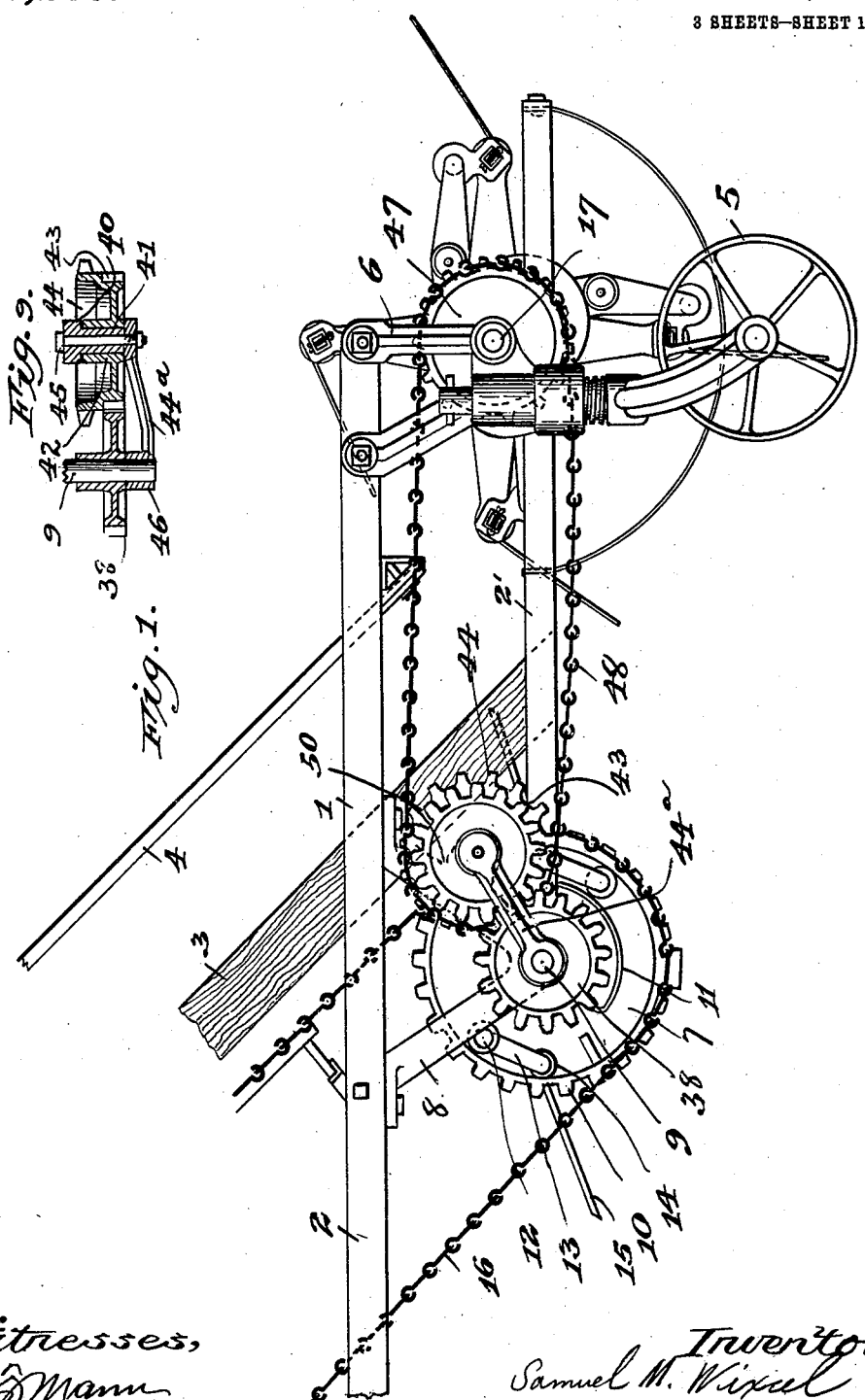

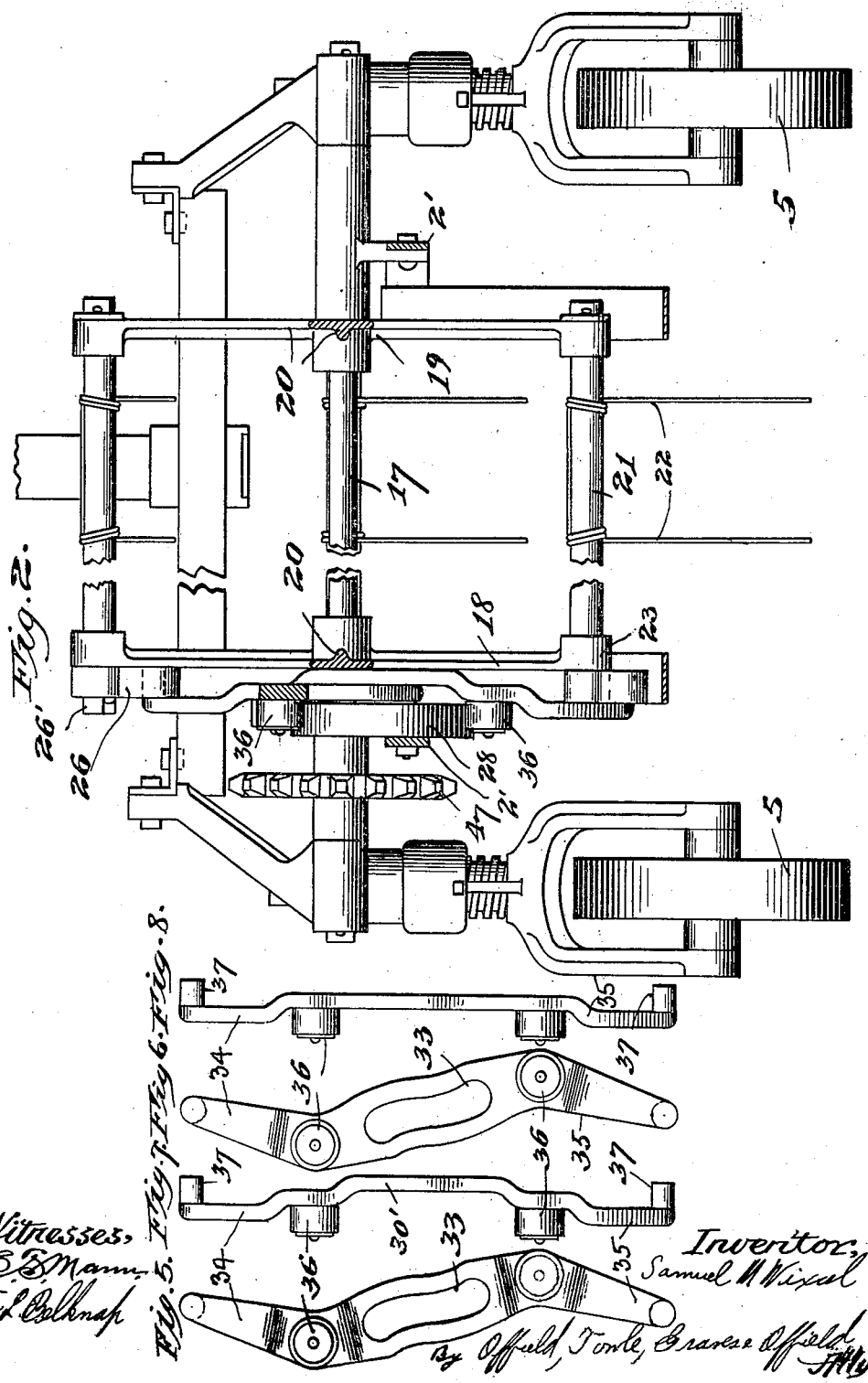

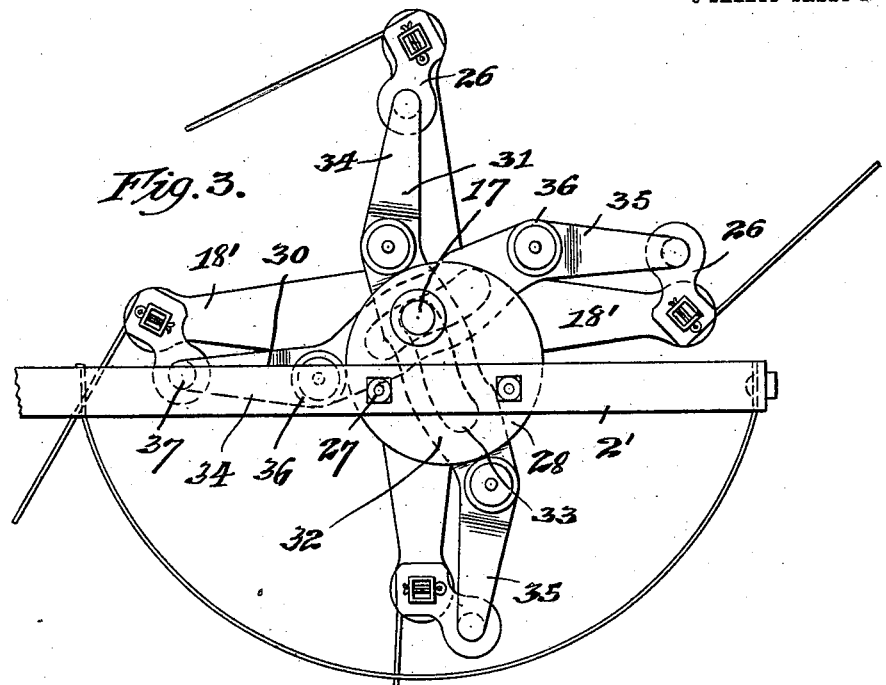
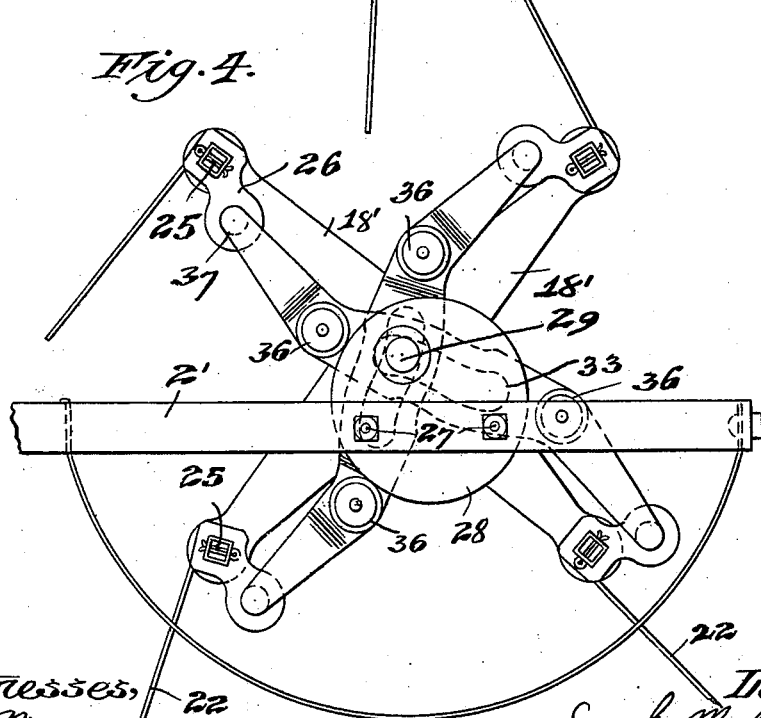

UNITED STATES PATENT OFFICE.

SAMUEL M. WIXCEL, OF MARCUS, IOWA.

HAY-LOADER.

988,236.   Specification of Letters Patent.   Patented Mar. 28, 1911.

Application filed May 20, 1910. Serial No. 562,423.

*To all whom it may concern:*

Be it known that I, SAMUEL M. WIXCEL, a citizen of the United States, residing in the city of Marcus, county of Cherokee, and State of Iowa, have invented certain new and useful Improvements in Hay-Loaders, of which the following is a specification.

This invention relates to improvements in hay loaders and refers more particularly to improvements in hay loaders of that type in which a rotary rake mechanism coöperates with a pick-up rake to carry the hay to the traveling conveyer.

Among the salient objects of the invention are to provide improvements in the mechanism of the rotary rake, which contribute in securing a more effective and reliable operation of the rake in a simplified manner; to provide a construction in which the respective sets of rake teeth have a movement of rotation independent of the rotary movement of the rake head, and are positively maintained in their various angular positions; to provide a construction in which the rake shafts which carry the teeth are so rotated as to maintain the teeth in raking engagement with the hay during one principal portion of the bodily travel of the rake head; and are then positively shifted to permit the teeth to withdraw freely from the hay as the latter is gathered by the pick-up fingers; to provide a construction in which the angular relations of the rake teeth to the head are controlled by a simple cam mechanism and in which the opposed sets of teeth are interconnected to move in synchronism; to provide a construction which is devoid of relatively weak and complicated parts, such as springs and tripping mechanisms, thereby insuring a more reliable operation of the rake as a whole; to provide improvements in the details of arrangement and construction of the various parts; and in general to provide an improved construction of the character referred to.

The invention consists in the matters hereinafter described and more particularly pointed out in the appended claims.

In the drawings—Figure 1 is a side elevation of the rear end of the hay loader embodying the present improvements; Fig. 2 is a fragmentary rear end elevation of the rotary rake mechanism, parts being shown in section to more clearly bring out details of construction; Fig. 3 is a side elevation of the rotary rake proper, parts being shown in dotted lines to more clearly bring out details of construction; Fig. 4 is a view similar to Fig. 3, with the parts shown, however, in a different angular position; Figs. 5 and 6 are side elevations of the cam links by which the rake teeth are shifted; Figs. 7 and 8 are end elevations of the views shown in Fig. 5 and Fig. 6 respectively. Fig. 9 is a cross sectional detail showing the manner of mounting one of the driving sprockets.

Referring to the drawings, 1 designates as a whole the rear end portion of the frame of the machine having main side members 2 and obliquely disposed elevated side frame members 3 and a hay confining frame 4 all in a well known manner. The rear part of the main frame is supported on a pair of caster wheels 5 suitably connected with bracket castings 6 while the front end of the main frame is carried by supporting wheels (not shown).

7 designates as a whole the rotary pick-up head, which is journaled between a pair of brackets 8 carried by the respective side frame members 2 and comprising the shaft 9 journaled in and extending through said brackets, main sprockets 10 rigidly mounted upon the shaft 9 just inside of the respective brackets, cams 11 mounted upon and rigid with the brackets 8 and a series of cranked pick-up finger shafts 12 each of which is provided at each end with a crank extension 13 and a cam roller 14. Each pick-up shaft carries a series of fingers 15 rigidly connected thereto.

Trained around the sprockets 10 are carrier chains 16 which are positively driven from another part of the carrier (not shown), in such manner as to rotate the pick-up head.

The loader is, of course, provided with a suitable traveling conveyer and coöperating driving mechanism.

Describing now the rotary rake mechanism, which forms the important feature of my present invention, upon the cross shaft 17 are keyed or otherwise rigidly secured, adjacent to the respective ends thereof, a pair of star-shaped spiders 18, 19, each having four arms 18′ arranged in right angled relation. Each of these arms is preferably provided with a reinforcing rib 20. Through each pair of arms is arranged to extend a rake shaft 21 carrying a series of rake teeth 22; the rake shafts 21 are journaled in suitable bearings 23 formed in the ends of the spider arms in such a manner as to permit rotation of the shafts independently of the rotation of the spider. One end of each shaft is provided with a squared extension which projects through the bearing 23, and is held in place by means of a cotter pin 25. Between each cotter pin and the adjacent bearing 23 is mounted a crank link or arm 26 which has a squared end which fits over the similarly shaped extension of the corresponding rake shaft 21. The arrangement is such that each of these crank arms 26 is rigidly connected to the rake shaft, so that the actuation of the crank arms will rotate the crank shafts and connected teeth.

To one of the dividing bars 2' is bolted as shown at 27 an annular cam drum 28. This cam drum is apertured to receive the cross shaft 17 upon which is mounted connecting cam links designated 30 and 31 respectively. These links are of peculiar configuration and each comprises a central portion 32 having a cam slot 33, and offset end portions or arms, 34, 35 respectively. Each link is of generally similar construction except that the links 30 have their central portion inset as shown at 30'. To the respective arms 34 and 35 of each cam link is journaled a cam roller 36 which rides upon the periphery of the drum 28. It will be noted that the cam slots 33 permit limited longitudinal movement of the cam links 30 and 31 during their rotary movement. The outer end of each cam arm is pivotally connected as shown at 37 to the free end of the crank arm 26. The arrangement just described is such that as the cam rollers ride around the drum, the cam links will gradually change their angular relation to the rake head axis 17. Inasmuch as these links are connected to the crank arms 26, the rake shafts and connected teeth will also change their angular relation. The parts are so connected that the rake teeth will be maintained in raking engagement with the hay through a principal portion of the travel of the rake, but will be easily retracted from the hay as the latter passes up to the conveyer. It will be noted in Fig. 3 that two of the cam rollers 36 are out of engagement with the drum 28. This results from the fact that the weight of the hay as it is carried up to the pick-up fingers is sufficient to force the opposite roller of the link 30 into engagement with the drum.

Describing now the manner of driving the rotary rake, one of the brackets 8 is provided with an ear 40 carrying a journal stud 41 upon which is journaled a hub 42 carrying a spur gear 43 and a sprocket wheel 44 respectively. The gear 43 meshes with a similar spur gear 38 keyed to an extension of the shaft 9. The stud 41 is reinforced by means of a brace arm 44ª and through bolt 45. The other end of the brace arm 44ª is provided with a hub 46 which fits over the outer end of the shaft 9. The rotary rake is provided with a sprocket 47 which is driven by a chain 48 trained around this sprocket and the sprocket 44. The particular manner of driving the rotary rake may, however, be varied if desired.

The operation of my invention need not be described in detail.

The invention is not limited to the details of construction shown except as set forth in the appended claims.

I claim as my invention:

1. In a raking mechanism, the combination with a wheeled main frame, of a rotary rake-head comprising a supporting frame bodily rotatable about a central axis, a plurality of rake shafts mounted to rotate each about its own axis in said supporting frame, and spaced apart angularly, each rake shaft carrying a series of teeth, a cam, endwise shiftable rotating cam links connected to said rake shafts, and cam wipers carried by said links and riding upon said cam whereby a rotary movement is imparted to said rake shafts independent of the rotation of said supporting frame.

2. In a raking mechanism, the combination with a wheeled main frame, of a rotary rake-head mounted thereon and comprising a supporting frame bodily rotatable about a central axis, a plurality of rake shafts mounted to rotate each about its own axis in said supporting frame, each rake shaft carrying a series of teeth, a cam endwise shiftable cam links rotating with said supporting frame, cranks connecting said links to the rake shafts, and cam wipers carried by the links and riding on said cam whereby said rake shafts have a movement of rotation independent of the rotary movement of the supporting frame.

3. In a raking mechanism, the combination with a rotating supporting frame, of rake shafts carried thereby and mounted to oscillate, each about its own axis in said supporting frame, rake teeth carried by said shafts, a circular endwise shiftable cam, cam links rotating with said frame and having wipers riding upon said cam and operative connections between said cam links and the rake shafts whereby the latter have a movement of rotation independent of the rotary movement of the supporting frame.

4. In a raking mechanism, the combination with a rotating supporting frame, of a plurality of rake shafts mounted to rotate each about its own axis in said supporting frame and spaced apart angularly, each rake shaft carrying a series of teeth, an endwise shiftable cam, cam links rotating about the axis of the supporting frame and connected to said rake shafts, and cam wipers carried by said links and riding upon said cam whereby upon the rotation of said supporting frame an independent movement of rotation is imparted to the rake shafts.

5. In a raking mechanism, the combination with a rotating supporting frame, of a rake shaft carried thereby and having a movement of rotation independent of the rotary movement of said frame, a cam, an endwise shiftable member having coöperative engagement with said cam and operative connections between said member and the rake shaft.

6. In a raking mechanism, the combination with a rotary supporting frame, of rake shafts carried thereby and mounted to oscillate, each about its own axis in said supporting frame, rake teeth carried by said shafts, an endwise shiftable cam, cam links rotating with said frame and having wipers riding upon said cam, each link being connected at either end to one of said rake shafts whereby the latter have a movement of rotation independent of the rotary movement of the supporting frame.

7. In a raking mechanism, the combination with a rotating supporting frame, of rake shafts carried thereby and mounted to oscillate, each about its own axis in said frame, rake teeth carried by said shafts, endwise shiftable cam links rotating with said frame and having wipers riding upon said cam, each of said links being connected at either end to one of said rake shafts whereby the latter has a movement of rotation independent of the rotary movement of the supporting frame.

SAMUEL M. WIXCEL.

Witnesses:
Lois Force,
F. L. Belknap.

---

Copies of this patent may be obtained for five cents each, by addressing the "Commissioner of Patents, Washington, D. C."